(12) United States Patent
Krause et al.

(10) Patent No.: US 7,836,708 B2
(45) Date of Patent: Nov. 23, 2010

(54) APPARATUS AND METHOD FOR IDENTIFYING A FILTER ASSEMBLY

(75) Inventors: Andrew Krause, LaGrange, KY (US); Ramesh Janardhanam, Pardeeville, WI (US); Steven Root, Buckner, KY (US); Abdel Hamad, Prospect, KY (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 11/518,133

(22) Filed: Sep. 8, 2006

(65) Prior Publication Data

US 2008/0060982 A1 Mar. 13, 2008

(51) Int. Cl.
*F25B 49/00* (2006.01)
*B01D 35/00* (2006.01)
*B01D 21/30* (2006.01)

(52) U.S. Cl. .............................. 62/125; 210/85; 210/143

(58) Field of Classification Search .................... 62/125, 62/317; 210/85, 143
See application file for complete search history.

(56) References Cited

U.S. PATENT DOCUMENTS

| | | | |
|---|---|---|---|
| 5,674,381 A * | 10/1997 | Den Dekker | 210/85 |
| 5,868,925 A * | 2/1999 | Turchetti | 210/86 |
| 6,051,144 A | 4/2000 | Clack et al. | |
| 6,303,031 B1 | 10/2001 | Senner | |
| 6,355,177 B2 | 3/2002 | Senner et al. | |
| 6,491,811 B2 * | 12/2002 | Conrad et al. | 210/85 |
| 6,551,503 B2 * | 4/2003 | Niers et al. | 210/85 |
| 7,481,917 B2 * | 1/2009 | Ikeyama et al. | 210/85 |
| 2001/0042707 A1 * | 11/2001 | Niers et al. | 210/85 |
| 2002/0144937 A1 * | 10/2002 | Wilberscheid et al. | 210/85 |
| 2002/0144938 A1 * | 10/2002 | Hawkins et al. | 210/85 |
| 2003/0168389 A1 * | 9/2003 | Astle et al. | 210/85 |
| 2006/0060512 A1 * | 3/2006 | Astle et al. | 210/85 |
| 2007/0068190 A1 * | 3/2007 | Venkatakrishnan et al. | 62/389 |

* cited by examiner

*Primary Examiner*—Frantz F Jules
*Assistant Examiner*—Alexis K Cox
(74) *Attorney, Agent, or Firm*—George L. Rideout, Esq.; Armstrong Teasdale LLP

(57) ABSTRACT

A water filter identification system for a refrigerator including a refrigeration compartment includes a manifold assembly positioned within the refrigeration compartment and operatively coupled to a water dispensing system, and a monitoring device positioned with respect to the manifold assembly. The system also includes a filter assembly including a filter housing removably mounted to the manifold assembly and at least one indicator coupled to the filter housing. The at least one indicator is in signal communication with the monitoring device for facilitating identification of the filter assembly.

19 Claims, 4 Drawing Sheets

APPARATUS AND METHOD FOR IDENTIFYING A FILTER ASSEMBLY

This invention relates generally to water filter identification systems and, more particularly, to an apparatus and method for identifying a filter assembly for a refrigerator water dispensing system.

Several conventional refrigerators include water storage tanks for cooling and storing water to be dispensed. In one conventional water dispensing system, a serpentine water storage tank includes a water filter. Conventional water dispensing systems may include a water filter in fluid communication with a water storage tank located in a fresh food or freezer food compartment of the refrigerator.

The water filter is provided in the water dispensing system to remove undesired particles from the water. Different filters vary in filtering capacity and/or filtering functions. However, at least some water dispensing systems for conventional refrigerators are compatible only one size of water filter. Therefore, the water filter cannot be changed to meet specific water quality and/or water capacity concerns of the customers, which may discourage some consumers from purchasing a refrigerator having such a water dispensing system.

BRIEF DESCRIPTION OF THE INVENTION

In one aspect, a water filter identification system for a refrigerator including a refrigeration compartment is provided. The water filter identification system includes a manifold assembly positioned within the refrigeration compartment and operatively coupled to a water dispensing system. A monitoring device is positioned with respect to the manifold assembly. The system also includes a filter assembly including a filter housing that is removably mounted to the manifold assembly and at least one indicator coupled to the filter housing. The at least one indicator is in signal communication with the monitoring device for facilitating identification of the filter assembly.

In another aspect, a refrigerator is provided. The refrigerator includes a refrigeration compartment. A manifold assembly is positioned within the refrigeration compartment and operatively coupled to a water dispensing system. The manifold assembly includes a monitoring device and a filter assembly for facilitating filtering water through the water dispensing system. The filter assembly includes a filter housing that is removably mounted to the manifold assembly and at least one indicator coupled to the filter housing. The at least one indicator is in signal communication with the monitoring device for facilitating identification of the filter assembly. The refrigerator also includes a controller in signal communication with the monitoring device. The controller is configured to identify the filter assembly based on a signal received from the monitoring device.

In another aspect, a method for identifying a filter assembly operatively coupled to a water dispensing system of a refrigerator is provided. The method includes positioning a manifold assembly within a refrigeration compartment of the refrigerator. The manifold assembly includes a monitoring device with at least one filter sensor and a controller in communication with the at least one filter sensor. A filter assembly is removably mounted to the manifold assembly. The filter assembly is configured to filter water channeled therethrough. The filter assembly includes a filter housing and at least one filter indicator coupled to the filter housing. The at least one filter indicator interfaces with a corresponding filter sensor. A signal is transmitted from the at least one filter sensor to the controller upon interfacing with the corresponding filter indicator to identify the filter assembly.

DETAILED DESCRIPTION OF THE INVENTION

Figure 1:
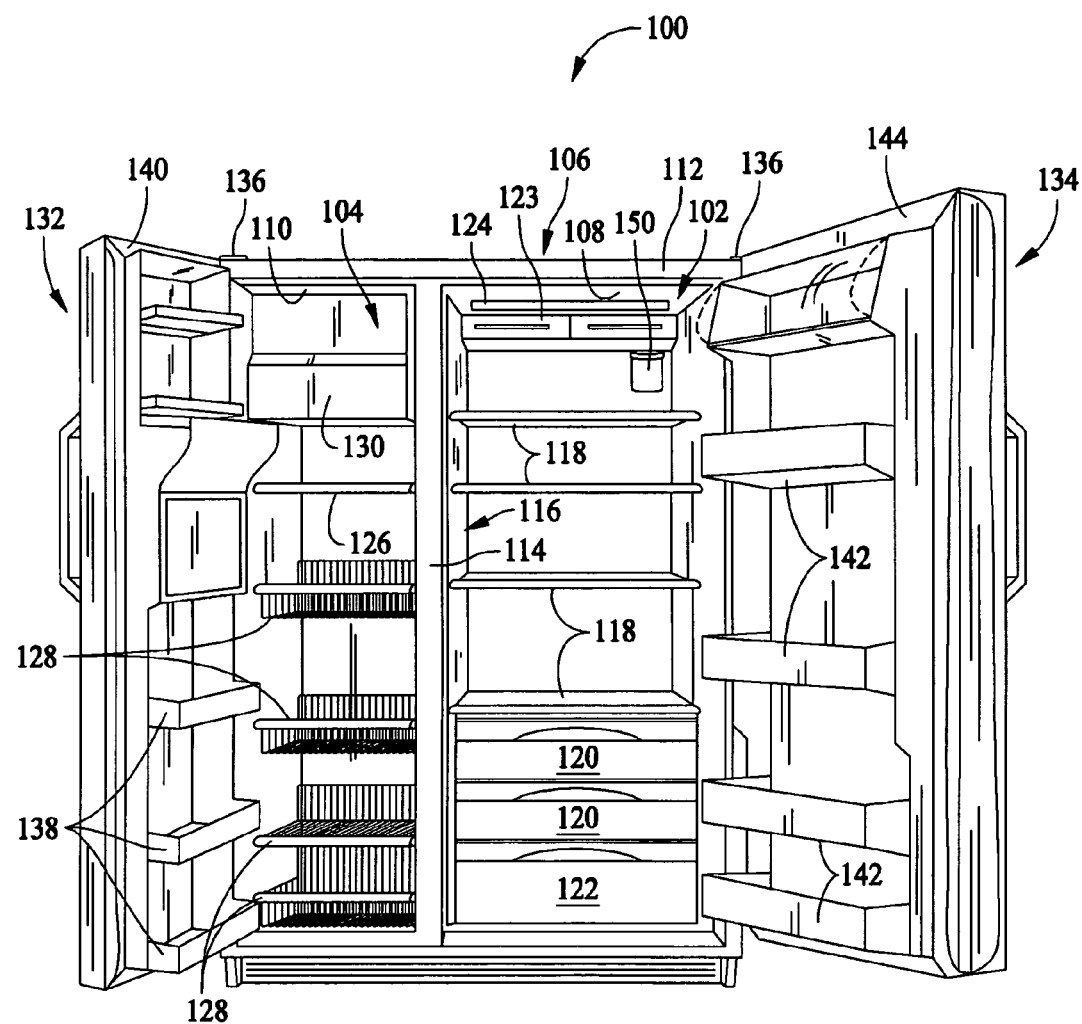
FIG. 1 is a perspective view of an exemplary refrigerator.

FIG. 1 is a perspective view of an exemplary refrigerator 100 in which exemplary embodiments of the present invention may be practiced and for which the benefits of the invention may be realized. It is apparent to those skilled in the art and guided by the teachings herein provided that the apparatus and/or method, as described herein, may likewise be practiced in any suitable refrigerator. Therefore, refrigerator 100 as described and illustrated herein is for illustrative purposes only and is not intended to limit the herein described apparatus and/or method in any aspect.

FIG. 1 illustrates a side-by-side refrigerator 100 including a fresh food storage compartment 102 and a freezer storage compartment 104. Fresh food compartment 102 and freezer compartment 104 are arranged side-by-side. In one embodiment, refrigerator 100 is a commercially available refrigerator from General Electric Company, Appliance Park, Louisville, Ky. 40225, and is modified to incorporate the herein described apparatus. It is apparent to those skilled in the art and guided by the teachings herein provided that the present invention is suitable for incorporation into other types of refrigeration appliances including, without limitation, top and bottom mount refrigerators.

Fresh food storage compartment 102 and freezer storage compartment 104 are contained within an outer case 106 having inner liners 108 and 110. A space between outer case 106 and inner liners 108 and 110, and between liners 108 and 110, is filled with foamed-in-place insulation. In one embodiment, outer case 106 is formed by folding a sheet of a suitable material, such as pre-painted steel, into an inverted U-shape to form a top wall and side walls of outer case 106. In this embodiment, outer case 106 is formed separately and coupled to the side walls and a bottom frame that provides support for refrigerator 100. Inner liners 108 and 110 are molded from a suitable plastic material to form fresh food compartment 102 and freezer compartment 104, respectively. In an alternative embodiment, inner liners 108 and/or 110 are formed by bending and welding a sheet of a suitable metal, such as steel. The illustrative embodiment includes two separate inner liners 108 and 110, as refrigerator 100 is a relatively large capacity unit and separate liners add strength and are easier to maintain within manufacturing tolerances. In smaller refrigerators, a single liner is formed and a mullion spans between opposite sides of the liner to divide it into a freezer compartment and a fresh food compartment.

A breaker strip 112 extends between a case front flange and outer front edges of inner liners 108 and 110. Breaker strip 112 is formed from a suitable resilient material, such as an extruded acrylo-butadiene-styrene based material (commonly referred to as ABS).

The insulation in the space between inner liners 108 and 110 is covered by another strip of suitable resilient material, commonly referred to as a mullion 114. In this embodiment, mullion 114 is formed of an extruded ABS material. Breaker strip 112 and mullion 114 form a front face, and extend completely around inner peripheral edges of outer case 106 and vertically between inner liners 108 and 110. Mullion 114, the insulation between compartments, and a spaced wall of liners separating the compartments, may be collectively referred to herein as a center mullion wall 116.

Shelves 118 and slide-out drawers 120 normally are provided in fresh food compartment 102 to support items being stored therein. A bottom drawer or pan 122 may partly form a quick chill and thaw system (not shown), which is selectively controlled, together with other refrigerator features, by a controller 123. In one embodiment, controller 123 selectively controls refrigerator features according to user preference via manipulation of a control interface 124 mounted in an upper region of fresh food storage compartment 102 and coupled to controller 123. At least one shelf 126 and/or at least one wire basket 128 are also provided in freezer compartment 104.

Controller 123 is mounted within refrigerator 100 and is programmed to perform functions described herein. As used herein, the term "controller" is not limited to integrated circuits referred to in the art as a microprocessor, but broadly refers to computers, processors, microcontrollers, microcomputers, programmable logic controllers, application specific integrated circuits and/or other programmable circuits, and these terms are used interchangeably herein.

Freezer compartment 104 includes an automatic ice maker 130 including a dispenser 131 provided in freezer door 132 so that ice can be dispensed without opening freezer door 132. In one embodiment, ice maker 130 includes a number of electromechanical elements that manipulate a mold to shape ice as it freezes, a mechanism to remove or release frozen ice from the mold and a primary ice bucket for storage of ice produced in the mold. Periodically, the ice supply is replenished by ice maker 130 as ice is removed from the primary ice bucket. The storage capacity of the primary ice bucket is generally sufficient for normal use of refrigerator 100.

Figure 2:
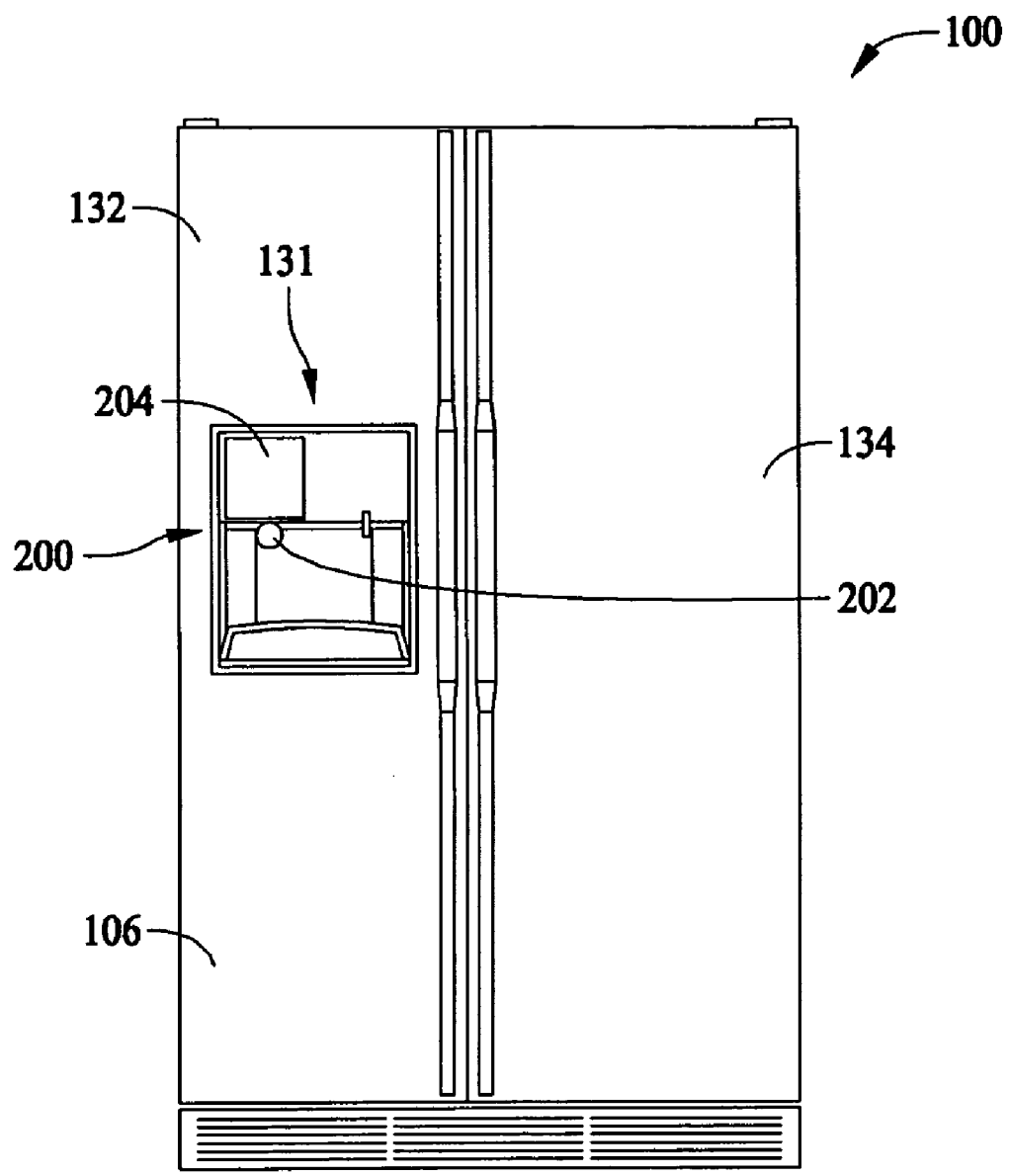
FIG. 2 is a front view of the refrigerator shown in FIG. 1.

Freezer door 132 and a fresh food door 134 close openings to freezer compartment 104 and fresh food compartment 102, respectively. Each door 132, 134 is mounted by a top hinge 136 and a cooperating bottom hinge (not shown) to rotate about an outer vertical edge between an open position, as shown in FIG. 1, and a closed position, as shown in FIG. 2. In one embodiment, freezer door 132 includes a plurality of storage shelves 138 and a sealing gasket 140. Similarly, fresh food door 134 includes a plurality of storage shelves 142 and a sealing gasket 144.

Refrigerator 100 includes a machinery compartment (not shown) that at least partially contains components for executing a known vapor compression cycle for cooling air. The components include a compressor, a condenser, an expansion device, and an evaporator connected in series and charged with a refrigerant. The evaporator is a type of heat exchanger that transfers heat from air passing over the evaporator to a refrigerant flowing through the evaporator, thereby causing the refrigerant to vaporize. The cooled air is used to refrigerate one or more refrigerator or freezer compartments via fans (not shown). Collectively, the vapor compression cycle components in a refrigeration circuit, associated fans and associated compartments are referred to herein as a "sealed system." The construction of the sealed system is well known and therefore not described in detail herein. The sealed system is operable to force cold air through the refrigerator.

In one embodiment, refrigerator 100 includes a filter assembly 150 mounted within fresh food compartment 102.

In alternative embodiments, filter assembly 150 is mounted with respect to any suitable location within or outside of refrigerator 100. Filter assembly 150 includes a filter medium 151 configured to remove particles from water channeled therethrough. Filter assembly 150 may include any suitable filter medium 151 to address different water quality and/or water capacity concerns of the consumers. In this embodiment, filter assembly 150 is compatible with any suitable filter medium 151 and provides the ability to use interchangeable filter media 151 with the water dispensing system described below.

In one embodiment, a water dispensing system 200 is partially mounted on freezer door 132. In this embodiment, water dispensing system 200 includes a water dispenser 202 extending through freezer door 132 and a user interface 204 mounted on the front face of freezer door 132. It is apparent to those skilled in the art and guided by the teachings herein provided that water dispensing system 200 may be mounted at any suitable location on refrigerator 100.

Figure 3:
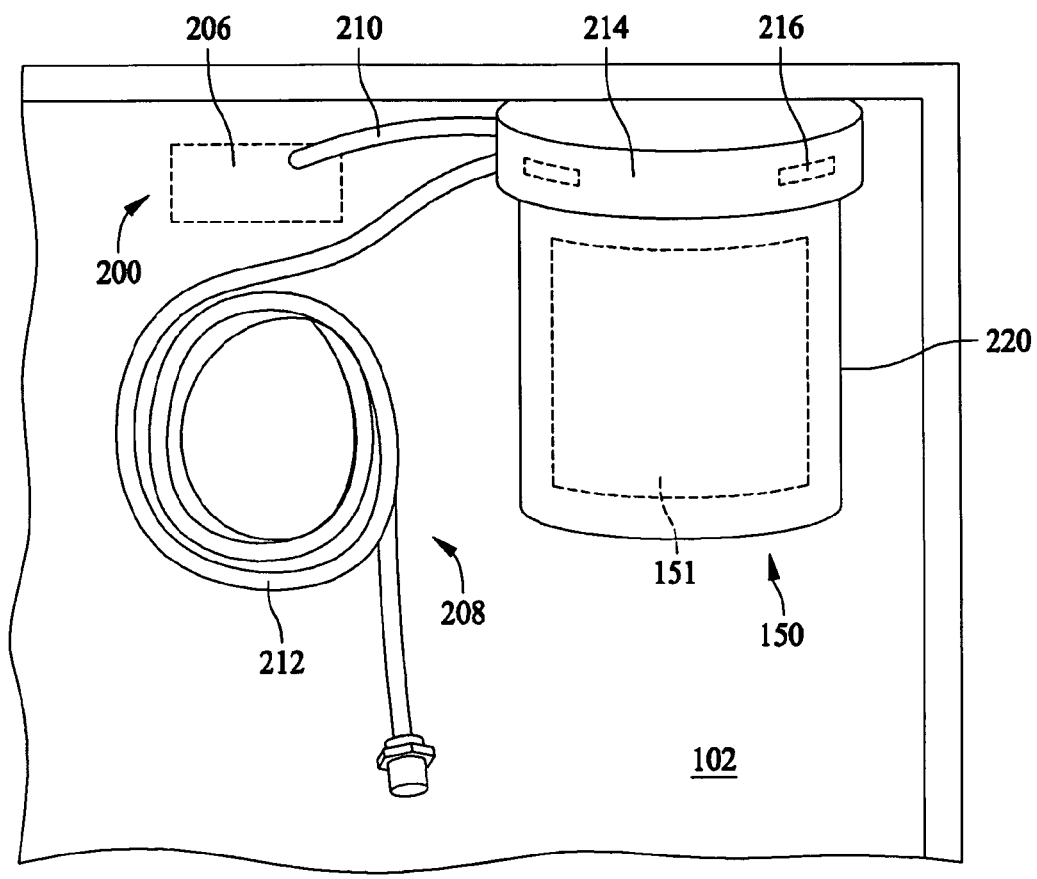
FIG. 3 is a schematic view of an exemplary water dispensing system suitable for use with the refrigerator shown in FIG. 1.

FIG. 3 is a schematic view of exemplary water dispensing system 200 suitable for incorporation into refrigerator 100 as shown in FIG. 1. Water dispensing system 200 includes a water tank 206 positioned within fresh food compartment 102. Water tank 206 is configured to store and/or cool water received from an external water source. Further, water tank 206 is in fluid communication with filter assembly 150.

In one embodiment, a manifold assembly 208 is positioned within fresh food compartment 102 and is coupled in flow communication with water dispensing system 200. As shown in FIG. 3, manifold assembly 208 includes an inlet line 210 coupled in flow communication with water tank 206 and an outlet line 212 coupled in flow communication with dispenser 202, as shown in FIG. 2. Manifold assembly 208 includes a filter support 214 including at least one monitoring device 216. In one embodiment, a plurality of monitoring devices 216 are coupled to filter support 214 for facilitating detecting a filter assembly mounted to manifold assembly 208. In one embodiment, monitoring devices 216 are reed switches that are electronically coupled in signal communication with controller 123, shown in FIG. 1. Controller 123 receives a signal from at least one monitoring device 216 and identifies the type of filter medium 151 within filter assembly 150 based on the signal received from the at least one monitoring device 216. It is apparent to those skilled in the art and guided by the teachings herein provided that any suitable number of monitoring devices 216 may be incorporated into manifold assembly 208 for facilitating detecting filter medium 151 operatively coupled to manifold assembly 208.

In one embodiment, filter assembly 150 is removably mounted on filter support 214 for filtering water. Filter assembly 150 includes a cylindrical filter housing 220 defining a chamber within which filter medium 151 is positioned. Filter medium 151 facilitates filtering water channeled through filter assembly 150. In one embodiment, different types of filter assemblies 150 with different filter medium 151 are interchangeably mounted to filter support 214. In one embodiment, filter assemblies 150 with different filtering functions and/or characteristics, such as particle filtering, taste and odor removal filtering and/or lead and mercury removal filtering, may be selected by the consumer and mounted onto filter support 214. In an alternative embodiment, filter assemblies 150 with different filtering capacities, such as total flow until replacement and/or flow rate through filter, are mounted onto filter support 214. As such, different types of filter assemblies 150 may be used to address specific water quality concerns of the consumer.

Figure 4:
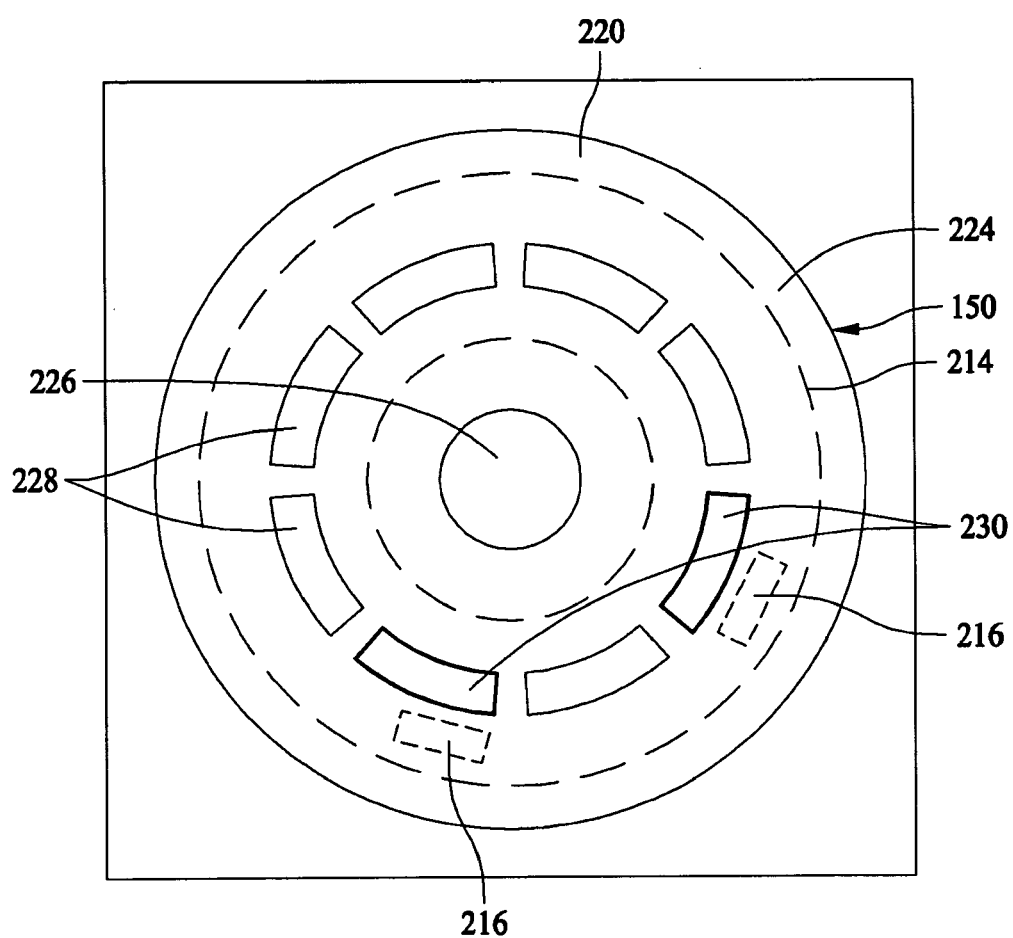
FIG. 4 is a top plan view of an exemplary filter assembly suitable for use with the water dispensing system shown in FIG. 3.

FIG. 4 is a top plan view of exemplary filter assembly 150 suitable for use with water dispensing system 200. Filter housing 220 includes an interface surface 224 for coupling to filter support 214. Filter housing 220 defines a central void 226 through interface surface 224 and a plurality of cavities 228 within interface surface 224. As shown in FIG. 4, cavities 228 circumferentially surround central void 226. In one embodiment, cavities 228 are substantially identical in shape and are spaced with respect to each other at an equal distance about central void 226.

In one embodiment, filter assembly 150 includes at least one indicator 230 coupled to filter housing 220. In a particular embodiment, each indicator 230 is selectively received in a corresponding cavity 228. In this embodiment, as shown in FIG. 4, filter assembly 150 includes two indicators 230 respectively received in corresponding cavity 288 and arranged radially about central void 226. In an alternative embodiment, filter assembly 150 includes only one indicator 230 positioned in a corresponding cavity 228. Any suitable number of indicators 230 positioned at one or more cavities 228 identify different types of filter assemblies 150. For example, two indicators 230 can distinguish and identify four types of filter assemblies 150. In a further embodiment, each indicator 230 is a magnet for communicating with the corresponding monitoring device 216. It is apparent to those skilled in the art and guided by the teachings herein provided that any suitable number of indicators 230 may be employed for facilitating identification of the filter assembly.

During operation of water dispensing system 200, unfiltered water is channeled from water tank 206 into filter assembly 150 mounted on filter support 214 through inlet line 210. Filter assembly 150 and, more specifically, filter medium 151, removes undesirable elements and/or particles from the water channeled therethrough for improving the water quality. The filtered water then flows from filter assembly 150 into water dispenser 202 positioned on freezer door 132 through outlet line 212. Water is cooled as the water is channeled through inlet line 210 and/or outlet line 212 of manifold assembly 208. The cooled, filtered water is channeled outside refrigerator 100 when the consumer operates user interface 204.

When filter assembly 150 is mounted onto filter support 214, indicator 230 is positioned adjacent monitoring device 216. In one embodiment, each monitoring device 216 includes a reed switch and each indicator 230 includes a magnet. Each reed switch communicates with the corresponding magnet. With the magnet of indicator 230 positioned within cavity 228, two contacts (not shown) within the corresponding reed switch are attracted to each other and allow an electrical current to pass through the reed switch. The reed switch then detects the existence of the magnet based on the electrical current flowing therethrough. A signal is transmitted from one or more reed switches to controller 123 for facilitating identifying the type of filter assembly 150 positioned within manifold assembly 208.

As described above, at least one indicator 230 is selectively positioned in a corresponding cavity 228 for indicating a selected type of filter assembly 150. In one embodiment, "1" indicates that there is an electrical current through the corresponding reed switch, and "0" indicates that there is no electrical current therethrough. Based on the signals received from the two reed switches, as shown in FIG. 4, different types of filter assemblies 150 may be identified by controller 123 as "00", "01", "11" and "10". In one embodiment, "00", "01", "11", and "10" correspond to a selected type of filter assembly 150. As such, controller 123 detects and/or identifies the type of filter assembly 150 based on the signals received from the reed switches.

In a further embodiment, controller 123 determines the filtering functions and/or filtering capacities based on the identified filter type. Controller 123 also operates water dispensing system 200 based upon the identification of filter assembly 150. Controller 123 channels water through filter assembly 150 upon the identification of filter assembly 150. Controller 123 may also determine the working condition and/or life expectancy of filter assembly 150 based on the determined filtering capacities. In alternative embodiments, any suitable number of indicators 216 are employed for facilitating identifying any suitable corresponding number of filter assemblies and/or filters. Further, in the alternative embodiments, any suitable number of sensors corresponding to the number of indicators are provided for cooperating with the indicators to identify the filter assemblies and/or filters.

While the invention has been described in terms of various specific embodiments, those skilled in the art will recognize that the invention can be practiced with modification within the spirit and scope of the claims.

What is claimed is:

1. A water filter identification system for a refrigerator comprising a refrigeration compartment, said water filter identification system comprising:

a manifold assembly positioned within said refrigeration compartment and operatively coupled to a water dispensing system;

a monitoring device coupled to said manifold assembly, said monitoring device comprising at least one sensor;

a filter assembly comprising a filter housing removably mounted to said manifold assembly, said filter housing defining a plurality of cavities within an interface surface of said filter housing and comprising two or more indicators selectively positioned within a corresponding cavity of said plurality of cavities, said interface surface defining a central void, said plurality of cavities and said two or more indicators circumferentially surrounding said central void, said filter assembly configured to be compatible with any suitable filter medium;

said two or more indicators in signal communication with said at least one sensor with said filter housing mounted onto said manifold assembly for facilitating identification of said filter assembly and an identification of a filter medium within said filter assembly; and a controller configured to identify said filter assembly and said filter medium based on data within a signal received from said sensor, said data comprising location information of the two or more indicators and a presence of an electrical current within each of the two or more indicators, said controller further configured to operate said water dispensing system based on the identification of said filter assembly and said filter medium.

2. A water filter identification system in accordance with claim 1 further comprising a filter medium positioned within said filter housing and configured to filter water channeled therethrough.

3. A water filter identification system in accordance with claim 1 wherein said at least one sensor is in signal receiving communication with said at least two indicators and a controller are operatively coupled to said at least one sensor.

4. A water filter identification system in accordance with claim 1 wherein said monitoring device further comprises at least two reed switches configured to detect said at least two indicators.

5. A water filter identification system in accordance with claim 1 wherein said at least two indicators comprise a plurality of magnets arranged radially about said central void of said filter housing.

6. A refrigerator comprising:
a refrigeration compartment;
a water dispensing system;
a manifold assembly positioned within said refrigeration compartment and operatively coupled to said water dispensing system, said manifold assembly including a monitoring device comprising at least one sensor;
a filter assembly for facilitating filtering water through said water dispensing system, said filter assembly comprising a filter housing removably mounted to said manifold assembly, said filter housing defining a plurality of cavities within an interface surface of said filter housing and comprising two or more indicators selectively positioned within a corresponding cavity of said plurality of cavities, said filter assembly configured to be compatible with any suitable filter medium, said interface surface defining a central void, and said plurality of cavities and said two or more indicators circumferentially surrounding said central void, said two or more indicators in signal communication with said at least one sensor with said filter housing mounted onto said manifold assembly for facilitating identification of said filter assembly and an identification of a filter medium within said filter assembly; and
a controller in signal communication with said monitoring device, said controller configured to identify said filter assembly and the filter medium with said filter assembly based on data within a signal received from said monitoring device, said data comprising location information of the two or more indicators and a presence of an electrical current within each of the two or more indicators, said controller configured to operate said water dispensing system based on the identification of said filter assembly and said filter medium.

7. A refrigerator in accordance with claim 6 wherein said at least two indicators comprise a magnet.

8. A refrigerator in accordance with claim 6 wherein said controller is in communication with said at least two indicators for facilitating determining a type of said filter assembly.

9. A refrigerator in accordance with claim 6 wherein said monitoring device is configured to detect said at least two indicators.

10. A refrigerator in accordance with claim 6 wherein said controller is configured to determine a filtering capacity of said filter assembly based on the received signal.

11. A refrigerator in accordance with claim 6 wherein said monitoring device comprises at least one reed switch.

12. A refrigerator in accordance with claim 6 wherein at least two indicators are circumferentially arranged on an interface surface of said filter housing.

13. A refrigerator in accordance with claim 6 wherein said water dispensing system further comprises a water tank in fluid communication with said filter assembly and configured to supply cooled water to said filter assembly, and a dispenser in fluid communication with said filter assembly and configured to dispense filtered cooled water.

14. A method for identifying a filter assembly operatively coupled to a water dispensing system of a refrigerator, said method comprising:
positioning a manifold assembly within a refrigeration compartment of the refrigerator, the manifold assembly comprising a monitoring device including at least one filter sensor and a controller in communication with the at least one filter sensor;
removably mounting a filter assembly to the manifold assembly, the filter assembly configured to filter water channeled therethrough, the filter assembly further configured to be compatible with any suitable filter medium, the filter assembly comprising a filter housing removably mounted to the manifold assembly and a filter medium, the filter housing defining a plurality of cavities within an interface surface of the filter housing and comprising two or more filter indicators selectively positioned within a corresponding cavity of said plurality of cavities, the interface surface defining a central void, the plurality of cavities and the two or more filter indicators circumferentially surrounding the central void, and the two or more filter indicators interfacing with the at least one filter sensor, with the filter housing mounted onto the manifold assembly;
transmitting a signal from the at least one filter sensor to the controller upon interfacing with the two or more filter indicators;
identifying the filter assembly and the filter medium based on data within the transmitted signal, the data comprising location information of the two or more indicators and a presence of an electrical current within each of the two or more indicators; and
operating the water dispensing system based on the identification of the filter assembly and the filter medium.

15. A method in accordance with claim 14 further comprising coupling a plurality of reed switches to the manifold assembly, the plurality of reed switches configured to detect the at least two filter indicators.

16. A method in accordance with claim 14 further comprising selectively positioning the at least two filter indicators within the corresponding cavities of the plurality of cavities to indicate a type of the filter assembly.

17. A method in accordance with claim 14 wherein identifying the filter assembly further comprises determining a type of the filter assembly based on the transmitted signal.

18. A method in accordance with claim 14 wherein identifying the filter assembly further comprises determining a filtering capacity of the filter assembly based on the transmitted signal.

19. A method in accordance with claim 14 further comprising operating the water dispensing system based upon the identification of the filter assembly.

* * * * *

UNITED STATES PATENT AND TRADEMARK OFFICE
CERTIFICATE OF CORRECTION

| | | |
|---|---|---|
| PATENT NO. | : 7,836,708 B2 | Page 1 of 1 |
| APPLICATION NO. | : 11/518133 | |
| DATED | : November 23, 2010 | |
| INVENTOR(S) | : Krause et al. | |

It is certified that error appears in the above-identified patent and that said Letters Patent is hereby corrected as shown below:

In column 1, line 19, delete "only one size of water filter" and insert therefor
-- only with one size of water filter --.

Signed and Sealed this
Third Day of April, 2012

David J. Kappos
*Director of the United States Patent and Trademark Office*